United States Patent [19]

Derner

[11] 4,136,915
[45] Jan. 30, 1979

[54] BALL BEARING RETAINER

[75] Inventor: William J. Derner, Indianapolis, Ind.

[73] Assignee: FMC Corporation, San Jose, Calif.

[21] Appl. No.: 788,373

[22] Filed: Apr. 18, 1977

[51] Int. Cl.² ............................................ F16C 33/38
[52] U.S. Cl. .................................................. 308/201
[58] Field of Search .............. 308/201, 193, 188, 235, 308/217, 212, 218; 29/148.4 R, 148.4 C, 148.4A

[56] References Cited

U.S. PATENT DOCUMENTS

| 1,767,107 | 6/1930 | Yates | 308/201 |
| 3,051,534 | 8/1962 | Kohler et al. | 308/217 |
| 3,157,443 | 11/1964 | Draudt | 308/201 |
| 3,239,282 | 3/1966 | Schroll et al. | 308/201 |
| 3,366,429 | 1/1968 | Fawick | 308/193 |
| 3,399,936 | 9/1968 | Vannest | 308/201 |
| 3,399,937 | 9/1968 | Vannest | 308/201 |
| 3,443,847 | 5/1969 | Dickinson | 308/201 |
| 3,482,297 | 12/1969 | Vannest | 29/148.4 |
| 3,506,316 | 4/1970 | McKee | 308/193 |
| 3,586,405 | 6/1971 | Claesson | 308/201 |
| 3,733,111 | 5/1973 | Harlan et al. | 308/218 |
| 3,820,867 | 6/1974 | Dickinson et al. | 308/201 |
| 3,938,866 | 2/1976 | Martin | 308/235 |

FOREIGN PATENT DOCUMENTS 1198221 12/1959 France ...................................... 308/201

Primary Examiner—Galen L. Barefoot
Assistant Examiner—Charles E. Frankfort
Attorney, Agent, or Firm—J. W. Edwards; J. F. Verhoeven

[57] ABSTRACT

A ball bearing retainer in the form of a unitary molded plastic ring has a central axis with an inner peripheral edge and an outer peripheral edge spaced about the axis. A base portion of the retainer ring extends between the inner and outer peripheral edges, and a plurality of ball bearing receiving pockets open axially of the retainer ring in a direction opposite from the base portion. Each pocket has a generally truncated spherical concave seat for retaining a ball bearing within the pocket. Each pocket has at least one generally cylindrical surface extending radially from one of the peripheral edges to intersect with the generally truncated spherical concave seat and thereby relieve the truncated spherical portion of the pocket adjacent the peripheral edge from which the cylindrical surface extends.

11 Claims, 5 Drawing Figures

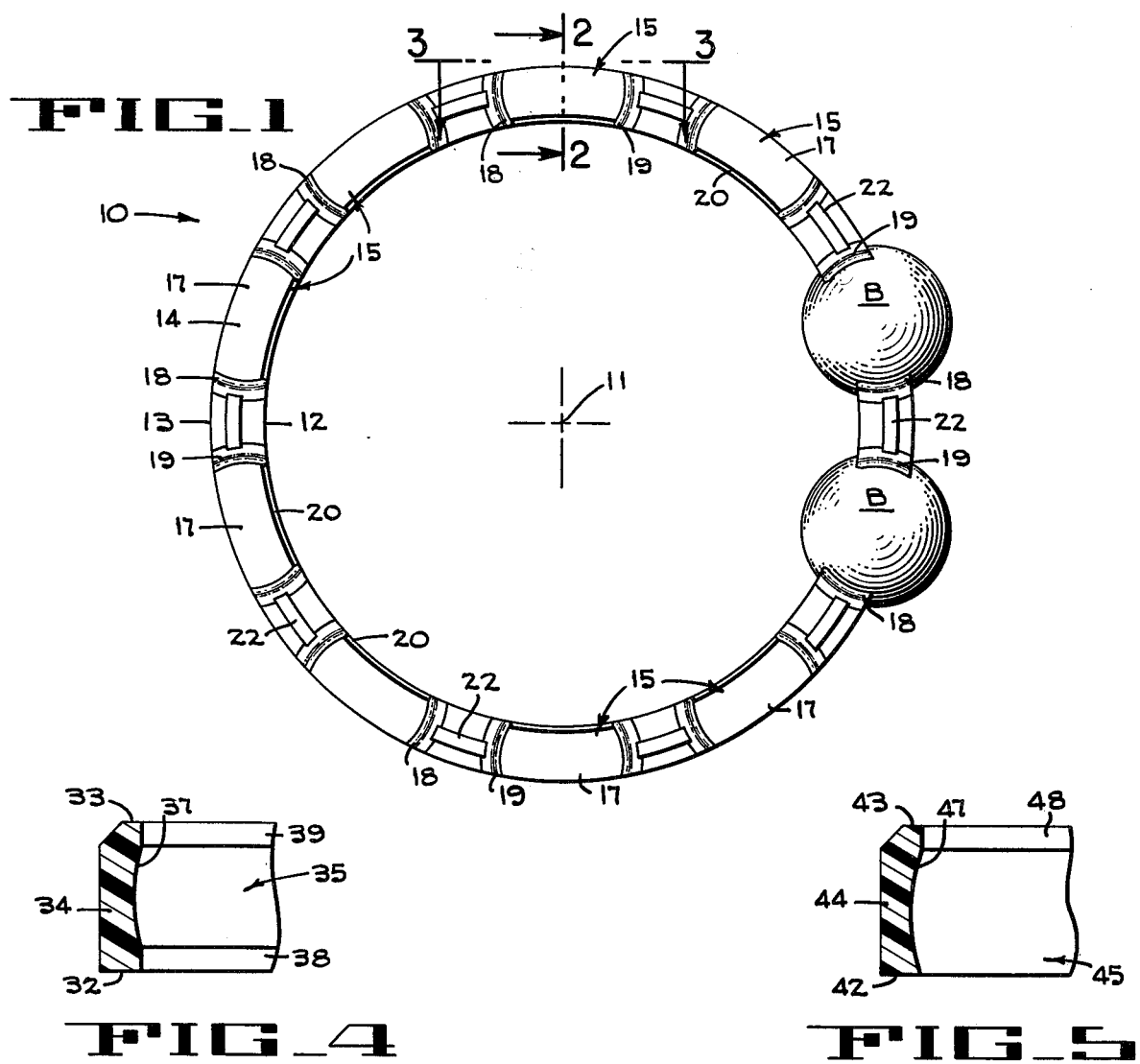
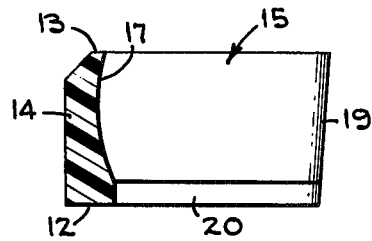
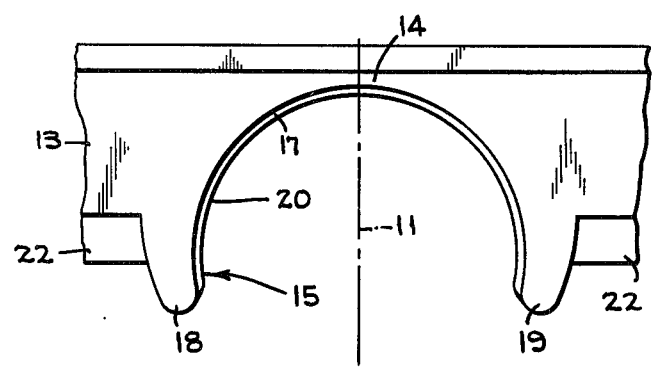

BALL BEARING RETAINER

BACKGROUND OF THE INVENTION

1. Field of the Invention

This invention relates to a ball bearing retainer or cage. More specifically, the invention pertains to such a retainer in the form of a unitary molded plastic ring having a central axis and a plurality of ball bearing pockets opening axially towards one side of the ring.

2. Description of the Prior Art

A ball bearing cage in the form of an annular body having axially extending open-ended ball-receiving slots is shown in U.S. Pat. No. 3,506,316, of McKee, dated Apr. 14, 1970. The annular body that defines the ball-receiving slots does not have truncated spherical concave seats. Draudt, U.S. Pat. No. 3,157,433, dated Nov. 17, 1964, shows ball receiving pockets formed by hemispheric recesses in an unyielding annular base with dividers further defining opposed, spherical, concave faces in spherical extension of each recess. The divider faces have feathered edges that have been struck in a circular manner to expose sufficient ball surface for desirable unobstructed engagement with the tori of the races and to facilitate insertion and removal of the balls to and from the pockets.

Molded plastic ball bearing retainers, in the form of annular bodies, normally have a plurality of ball bearing receiving pockets that are essentially a truncated spherical concave section. The retainer spherically wraps around a portion of the ball bearing to retain the ball bearing within the pocket, and a certain amount of clearance between the ball bearing and the retainer enables the ball bearing within the pocket to move radially with respect to the retainer. The spherical, wrap around portion of the retainer stiffens the annular body of the retainer. Such retainer stiffness contributes to retainer fatigue failure and limits the use of such retainers.

SUMMARY OF THE INVENTION

To improve the fatigue life and the flexibility of annular, molded plastic, ball bearing retainers, the spherical, wrap around portion of each ball bearing receiving pocket has been relieved by providing at least one generally cylindrical surface that extends radially from one of the peripheral edges of the annular retainer to intersect with a generally truncated spherical concave seat. In a preferred embodiment of the invention, fingers are disposed about each ball bearing receiving pocket. These fingers extend from a base portion of the annular retainer in an axial direction towards a side of the retainer on which the pockets open to further define the pocket. These fingers have opposed, truncated spherical concave faces coincident with and in extension of the truncated spherical concave seats of the pockets. The fingers have opposed generally cylindrical surfaces extending radially from at least one of the peripheral edges of the annular retainer to intersect with the generally truncated spherical seat, thereby relieving the truncated spherical portion of the pocket adjacent the peripheral edge from which the cylindrical surfaces extend.

BRIEF DESCRIPTION OF THE DRAWINGS

FIG. 1 is a side elevation view of a ball bearing retainer holding a couple of ball bearings and embodying the present invention.

FIG. 2 is an enlarged section that has been taken on the line 2—2 of FIG. 1.

FIG. 3 is an enlarged plan view of a ball bearing receiving pocket portion of the retainer ring, as taken on the line 3—3 of FIG. 1.

FIG. 4 is a partial section corresponding to FIG. 2 but illustrating a modified form of the invention wherein the truncated spherical portion of the pocket is relieved adjacent each peripheral edge.

FIG. 5 is a partial section corresponding to FIG. 2 but illustrating a modified form of the invention wherein the truncated spherical portion of the pocket is relieved adjacent the outer peripheral edge.

DESCRIPTION OF THE PREFERRED EMBODIMENT

Looking now at FIG. 1, a ball bearing retainer 10, in the form of a unitary molded plastic ring, has a central axis 11. The retainer ring has an inner peripheral edge 12 and an outer peripheral edge 13 that are radially spaced about the central axis. A base portion 14 of the retainer ring extends radially between the peripheral edges. A series of ball bearing receiving pockets 15, that open axially of the retainer ring in a direction opposite from the base portion, are spaced arcuately about the periphery of the retainer ring. These pockets hold spherical ball bearings B, as indicated in two of the pockets shown in FIG. 1.

The base portion 14, that is located adjacent each ball bearing receiving pocket 15, defines a seat 17 having a generally truncated, spherical concave surface, as shown in FIGS. 1 and 2. The pockets are further defined by a pair of fingers 18 and 19 that are disposed on opposite sides of the pocket. These fingers extend from the base portion, in a generally axial direction as shown in FIG. 3, towards the pocket opening. The fingers have opposed, truncated spherical concave surfaces coincident with and in extension of the truncated spherical concave seat of the pocket. The pocket, as defined by both the base portion and the fingers, has a generally cylindrical surface 20 extending radially outward from the inner peripheral edge 12 of the ball bearing retainer ring 10 to intersect with the generally truncated spherical concave seat. Thus, the truncated spherical portion of the pocket adjacent the inner peripheral edge is relieved to improve the flexibility and the fatigue life of the retainer ring.

A strut 22 extends, in contact with the base portion 14, between adjacent fingers 18 and 19 that are located between the pockets 15. The truncated spherical concave seat 17 of each pocket has a curvature, in a direction radially of the ring, that tends to wrap around and interlock with a corresponding convex portion of a ball bearing B, to hold the ball bearing in the pocket radially of the retainer ring. A certain amount of clearance, between the ball bearing B and the retainer ring, enables the ball bearing to move within the pocket, radially with respect to the retainer ring 10. Each pocket 15 has an axial depth that is appreciably greater than the radius of the ball bearing B. The diametrical dimension of the pocket between the opposed fingers 18 and 19 is appreciably greater than the diameter of the ball bearing, while the lateral spacing between the opposed fingers adjacent the pocket opening is less than the diameter of the ball bearing.

When a ball bearing B is inserted axially of the retainer ring 10 into a pocket 15, the fingers 18 and 19 on opposite sides of the pocket flex outward. The retainer ring can bend transversely about a radial line between the fingers at the base portion 14. After insertion of the ball bearing B, the fingers wrap around the ball bearing to hold the ball bearing in the pocket.

When designing ball bearing retainers, similar to retainer 10, it may be necessary to locate the center of the generally truncated spherical concave seat 17 along a radial line relative to the retainer ring in various positions relative to the peripheral edges of the ring. The ball bearings B must be located in relationship to the adjacent inner and outer races of a bearing assembly to provide a proper interfit therebetween. Sometimes one race will have a deep groove for receiving a ball bearing and the other race will have a shallow groove. Sufficient clearance must be maintained between the ball bearing retainer and the adjacent inner and outer rings of the bearing assembly. Variations in the location of the center of the truncated spherical concave seat often require a modification of the ball bearing retainer.

With reference to FIG. 4, a first modification is shown. In this form of the invention, a ball bearing retainer ring, similar to the retainer 10 with exception of the hereinafter described portion, has a base portion 34 that extends between an inner peripheral edge 32 and an outer peripheral edge 33 of the retainer ring. This base portion defines a seat 37 having a generally truncated, spherical concave surface, and this seat defines a ball bearing receiving pocket 35. A generally cylindrical surface 38 extends radially outward from the inner peripheral edge 32 to intersect with the generally truncated spherical concave seat. A generally cylindrical surface 39 extends radially inward from the outer peripheral edge to intersect with the generally truncated spherical concave seat. Thus, the truncated spherical portions of the pocket adjacent both the inner peripheral edge and the outer peripheral edge are relieved.

A second modification is illustrated in FIG. 5. In this form of the invention, a ball bearing retainer ring, similar to the retainer ring 10 except for the hereinafter described portion, has a base portion 44 that extends between an inner peripheral edge 42 and an outer peripheral edge 43. This base portion defines a seat 47 having a generally truncated, spherical concave surface, and this seat defines a ball bearing receiving pocket 45. A generally cylindrical surface 48 extends radially inward from the outer peripheral edge to intersect with the generally truncated spherical concave seat. Thus, the truncated spherical portion of the pocket adjacent the outer peripheral edge is relieved.

Although the best mode contemplated for carrying out the present invention has been herein shown and described, it will be apparent that modification and variation may be made without departing from what is regarded to be the subject matter of the invention.

What is claimed is:

1. A ball bearing retainer in the form of a unitary molded plastic ring having a central axis, an inner peripheral edge spaced about said axis, an outer peripheral edge spaced about said axis, a base portion extending between said inner and outer peripheral edges of the ring, and a plurality of ball bearing receiving pockets defined in part by fingers on opposite sides thereof and opening axially of the ring in a direction opposite from the base portion, each pocket having a generally truncated spherical concave seat for retaining a ball bearing within the pocket, each pocket having at least one generally cylindrical surface extending radially of the ring from one of the peripheral edges to intersect with the generally truncated spherical concave seat and thereby relieve the truncated spherical portion of the pocket adjacent the peripheral edge from which the cylindrical surface extends to improve the flexibility of the retainer for bending transversely about a line radial of the ring between said fingers and to improve the fatigue life of the retainer by eliminating a spherical wraparound portion of the retainer pocket that would be subjected to extreme stress due to such bending.

2. A ball bearing retainer as described in claim 1 wherein each ball bearing receiving pocket is defined by a pair of said fingers disposed on opposite sides of the pocket and extending from the base portion in a generally axial direction towards the pocket opening, said fingers having opposed truncated spherical concave surfaces coincident with and in extension of the truncated spherical concave seat of the pocket, said fingers having opposed generally cylindrical surfaces extending radially of the ring from at least one of the peripheral edges of the ring to intersect with the generally truncated spherical seat and thereby relieve the truncated spherical portion of the pocket adjacent the peripheral edge from which the cylindrical surface extends to improve the flexibility and the fatigue life of the fingers of the retainer.

3. A ball bearing retainer as described in claim 2 wherein said truncated spherical concave seat of each pocket has a curvature in a radial direction of the retainer ring that interlocks with a corresponding convex portion of a ball bearing to hold the bearing in the pocket radially of the retainer ring.

4. A ball bearing retainer as described in claim 3 wherein a certain amount of radial clearance is provided between the convex portion of the ball bearing and the truncated spherical concave seat to enable the ball bearing to move within the pocket radially with respect to the retainer.

5. A ball bearing retainer as described in claim 4 wherein each pocket has an axial depth that is appreciably greater than the radius of the ball bearing to be retained within the pocket.

6. A ball bearing retainer as described in claim 5 wherein each pocket has between the opposed fingers a diameter that is appreciably greater than the diameter of the ball bearing to be retained within the pocket, and the lateral spacing between the opposed fingers adjacent the pocket opening is less than the diameter of the ball bearing to be retained within the pocket.

7. In a ball bearing retainer in the form of a unitary molded plastic ring having a central axis, an inner peripheral edge spaced about said axis, an outer peripheral edge spaced about said axis, a base portion extending between said inner and said outer peripheral edges of the ring, and a plurality of ball bearing receiving pockets defined in part by fingers on opposite sides thereof and opening axially of the ring in a direction opposite from the base portion, said pockets having generally truncated spherical concave seat for retaining ball bearings within the pockets, the improvement comprising said pockets having generally cylindrical surfaces extending radially from the ring from at least one of the peripheral edges to intersect with the generally truncated spherical concave seats and thereby relieve the truncated spherical portions of the pockets adjacent the peripheral edge from which the cylindrical surfaces extend to improve the flexibility of the retainer for bending transversely about a line radial of the ring between said fingers and to improve the fatigue life of the retainer by eliminating a spherical wraparound portion of the retainer pocket that would be subject to extreme stress due to such bending.

8. An improved ball bearing retainer as described in claim 7 including a pair of said fingers disposed about each ball bearing pocket; said fingers extending from the base portion in a generally axial direction towards the side of the ring on which the pocket opens to further define opposed sides of the pocket; said fingers having opposed, truncated spherical concave faces coincident with and in extension of the pockets truncated spherical concave seat; said fingers having opposed generally cylindrical surfaces extending radially of the ring from at least one of the peripheral edges of the ring to intersect with the generally truncated spherical seat and thereby relieve the truncated spherical portion of the pocket adjacent the peripheral edge from which the cylindrical surface extends to improve the flexibility and the fatigue life of the fingers of the retainer.

9. An improved ball bearing retainer as described in claim 7 wherein the generally cylindrical surfaces extend radially of the ring outward from the inner peripheral edge of the ring to intersect with the generally truncated spherical seats and thereby relieve the truncated spherical portions of the pockets adjacent the inner peripheral edge.

10. An improved ball bearing retainer as described in claim 7 wherein the generally cylindrical surfaces extend radially of the ring inward from the outer peripheral edge of the ring to intersect with the generally truncated spherical seats and thereby relieve the truncated spherical portions of the pockets adjacent the outer peripheral edge.

11. An improved ball bearing retainer as described in claim 7 wherein generally cylindrical surfaces extend radially of the ring outward from the inner peripheral edge of the ring to intersect with the generally truncated spherical seats, and generally cylindrical surfaces extend radially of the ring inward from the outer peripheral edge of the ring to intersect with the generally truncated spherical seats, thereby relieving the truncated spherical portions of the pockets adjacent both the inner and the outer peripheral edges of the ring.

* * * * *